United States Patent [19]

Olander

[11] 4,126,103
[45] Nov. 21, 1978

[54] CONTROL APPARATUS FOR AUTOMATIC REMOVAL OF MILKING MEANS

[75] Inventor: Karl E. Olander, Sodertalje, Sweden

[73] Assignee: Alfa-Laval AB, Tumba, Sweden

[21] Appl. No.: 804,073

[22] Filed: Jun. 6, 1977

[30] Foreign Application Priority Data

Jun. 10, 1976 [SE] Sweden .............................. 7606543

[51] Int. Cl.² ............................ A01J 5/04; A01J 7/00
[52] U.S. Cl. ............................. 119/14.08; 137/101.27
[58] Field of Search ............... 119/14.08, 14.14, 14.01, 119/14.44, 14.46; 137/101.27

[56] References Cited
U.S. PATENT DOCUMENTS

| 3,789,798 | 2/1974 | Reisgies et al. | 119/14.08 |
| 3,861,355 | 1/1975 | Johnson et al. | 119/14.08 |
| 3,931,794 | 1/1976 | Chillingworth | 119/14.08 |

Primary Examiner—Hugh R. Chamblee
Attorney, Agent, or Firm—Cyrus S. Hapgood

[57] ABSTRACT

A primary valve has an open position for effecting operation of a milking means remover upon completion of a milking operation. A secondary valve has a first position for causing a pneumatic actuator to maintain the primary valve closed in response to normal milk flow from the milking means and has a second position for causing the actuator to open the primary valve in response to substantial cessation of the milk flow. Means associated with the actuator are operable upon said opening of the primary valve to keep it open regardless of the position of the secondary valve.

6 Claims, 3 Drawing Figures

CONTROL APPARATUS FOR AUTOMATIC REMOVAL OF MILKING MEANS

The present invention relates to an apparatus for controlling automatic removal of the milking means of a milking machine after milking, comprising a vacuum source, a pneumatic removing means and a milk flow rate sensor adapted to control the activation of the removing means in relation to the milk flow rate.

In milking machines equipped for automatic removal of the milking means from the cow's udder after milking, it is common practice to use a sensor which senses the milk flow rate and initiates the removal when the milk flow has decreased to a predetermined value. When the sensor initiates the removal, a removing means is activated which is usually a pneumatic cylinder assembly that provides for the removal of the milking means.

In some cases, however, depending upon the individual character of the cow, it appears that the milk flow rate increases temporarily again, after initiation of the removal. The removal which has started is then temporarily interrupted and is again started when the milk flow rate decreases again. This situation is very unsatisfactory in that it is irritating for the cow and in addition might cause the milking means to drop onto the floor instead of being removed properly.

The principal object of the present invention is to eliminate the above-noted disadvantage of previously used automatic milking means removers and to provide an apparatus which ensures that an initiated removal is accomplished in the normal way independently of possible changes of the milk flow rate after the removal has been initiated. This object is achieved by means of an apparatus of the kind first mentioned above and which, according to the invention, is generally characterized in that the milk flow rate sensor is adapted to actuate a pneumatic actuator via a first valve in order to adjust a second valve adapted to control the connection between the vacuum source and the removing means, said actuator having means adapted to maintain the second valve open after it has been adjusted to its open position, regardless of the position of said first valve.

The invention will be described in more detail below with reference to the accompanying drawings, in which FIGS. 1-3 are vertical sectional views of a preferred embodiment of the new control apparatus shown in three different positions corresponding to three different phases of the milking process. Thus, FIG. 1 shows the apparatus in its position during an initial phase before the flow of milk has started.

Figure 1:
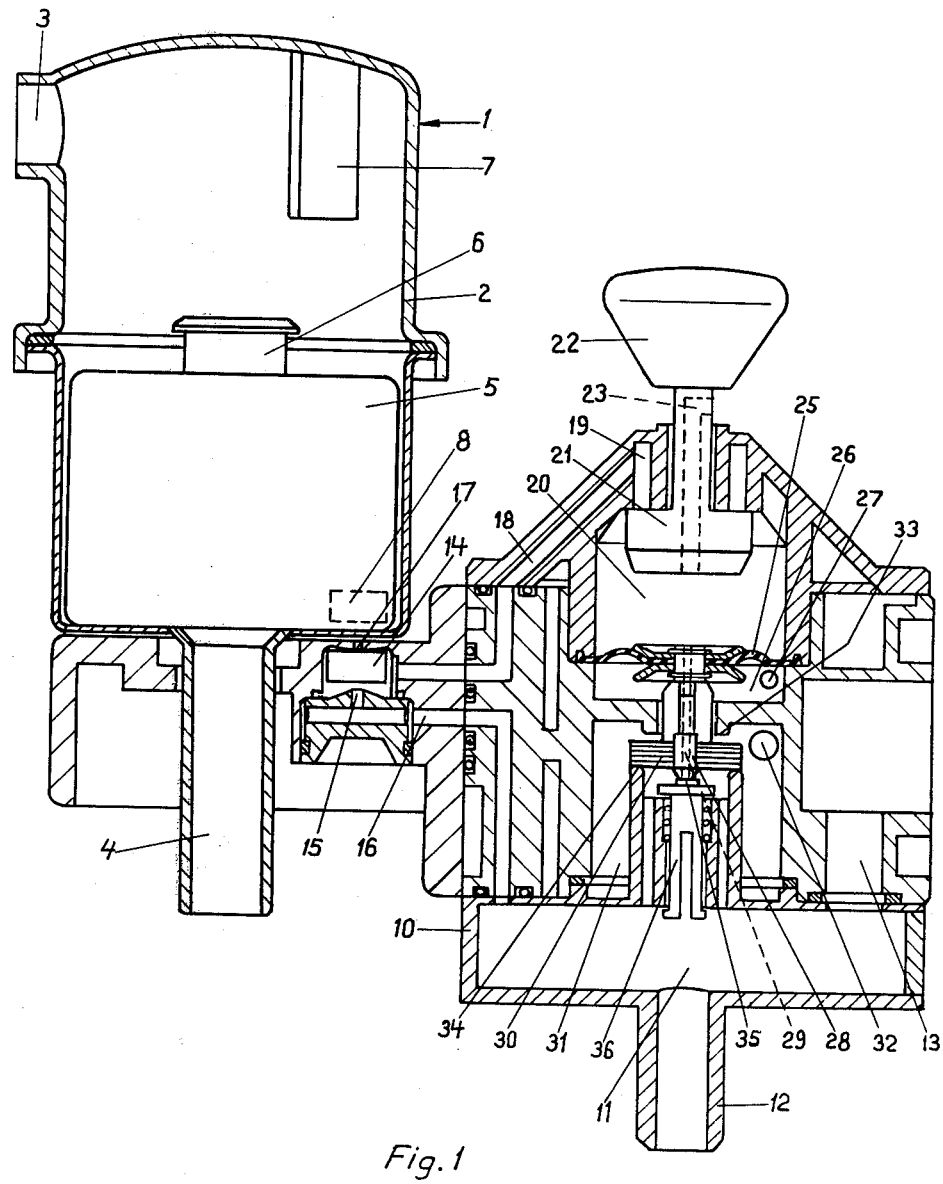

The control apparatus shown in the drawings comprises a milk flow sensor 1 having a receptacle 2 provided with a milk inlet 3 and a milk outlet 4. In the receptacle 2 is a vertically movable float 5 carrying a slidable central pin 6 which cooperates with a seat in the milk outlet 4 to operate as a valve means. The upward vertical movement of the float is restricted by a stop 7. A drain opening (not shown) is provided in the contact surface between the pin 6 and the outlet 4, said opening allowing a restricted milk flow through the outlet even when the pin 6 is in its lower, closed position. Inlet 3 is adapted to receive the milk from the teat cups or milking means of a milking machine (not shown).

The milk flow sensor 1 is connected to a valve housing 10 having a manifold chamber 11 which is connected via a tube connection 12 to a vacuum source (not shown). The chamber 11 is connected via a passage 13 to a pulsator (not shown). A magnet valve 14 cooperates with a permanent magnet 8 provided in the float 5 and is positioned directly above a valve opening 15 connected to the manifold chamber 11 via a passage 16, the valve member 14 being directly below a valve opening 17 connected to the atmosphere. The space containing valve 14 is connected via a passage 18 to an annular chamber 19 at the top portion of the valve housing 10. The chamber 19 is connected to a chamber 20 and may be shut off therefrom by means of a valve 21 which is adjustable manually by means of a knob 22. The valve stem interconnecting the valve 21 and the knob 22 has an axial air passage 23.

By means of a flexible membrane 25, the chamber 20 is separated from a chamber 26 which is constantly connected to the atmosphere via an opening 27. The membrane 25 is secured to one end of a central spindle 28 having an axial through-passage 29 and carrying a disc valve 30 at its other end. The valve 30 controls the connection to a chamber 31 which is connected through an opening 32 to a pneumatic cylinder assembly (not shown) for removing the milking means. For this purpose, the valve cooperates with an upper valve seat 33 and a lower valve seat 34. The lower end of the spindle 28 cooperates with a valve cushion 35 secured to a pin 36 which is mounted for a restricted axial movement and resiliently actuated to press the cushion 35 towards the end of the spindle 28.

In the operation of the apparatus, before applying the milking means (teat cups) to the cow's udder, the valve 21 is lifted to the position shown in FIG. 1 by means of the knob 22. The float 5 is in its lower position, the magnet valve 14 keeping the upper opening 17 closed while the lower opening 15 is kept open. The annular chamber 19 in the top portion of the valve housing is thus connected with the vacuum source 12 via the passages 16 and 18; and because of the sub-atmospheric pressure in the chamber 19, the valve 21 is maintained in its upper position. The chamber 20 is connected to the atmosphere via the passage 23, and the disc valve 30 seals against its lower valve seat 34. The axial passage 29 of the valve spindle 28 is kept closed by the cushion 35. In this position, the chambers 26 and 31 communicate with each other and are subjected to atmospheric pressure via the opening 27. The milking means remover is thus not activated through opening 32.

Figure 2:
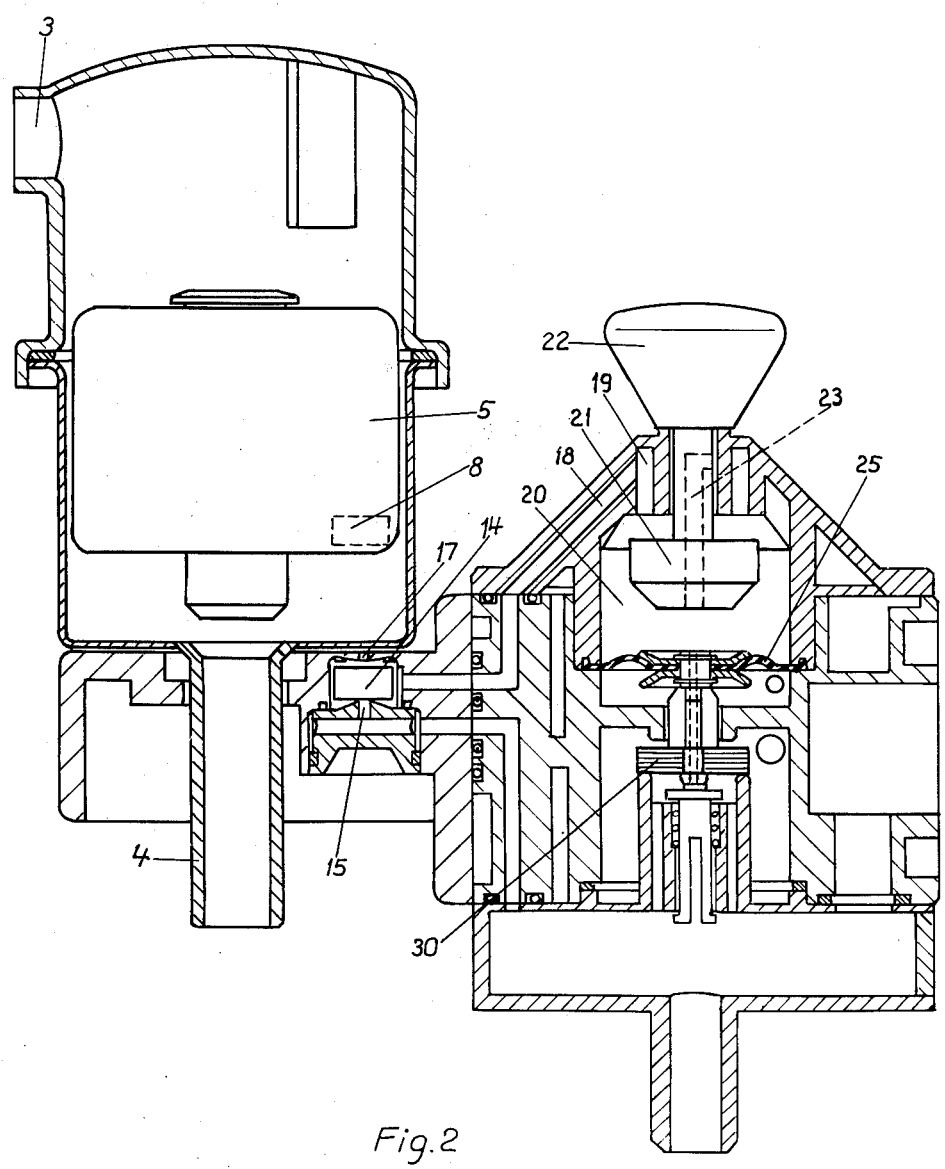
FIG. 2 shows the positon during milking with a normal milk flow.

When the flow of milk through the milk inlet 3 has started and reached a certain rate, the float 5 rises as shown in FIG. 2, whereby the milk outlet 4 is opened. In addition, the influence of the magnet 8 on the magnet valve 14 is interrupted so that valve 14 descends by gravity to close the lower opening 15 while uncovering the upper opening 17. The connection of the annular chamber 19 with the vacuum source is hereby interrupted and atmospheric air flows into this chamber via the opening 17 and the passage 18. When the vacuum in the chamber 19 is eliminated, the valve 21 with the knob 22 drops by gravity to the position according to FIG. 2. The chamber 20 is thereby connected to the atmosphere through opening 17 and passage 18 instead of through the passage 23 in the stem of the valve 21. The pressure in the chamber 20 is thus not changed and consequently the positions of the membrane 25 and the disc valve 30 are not changed.

Figure 3:
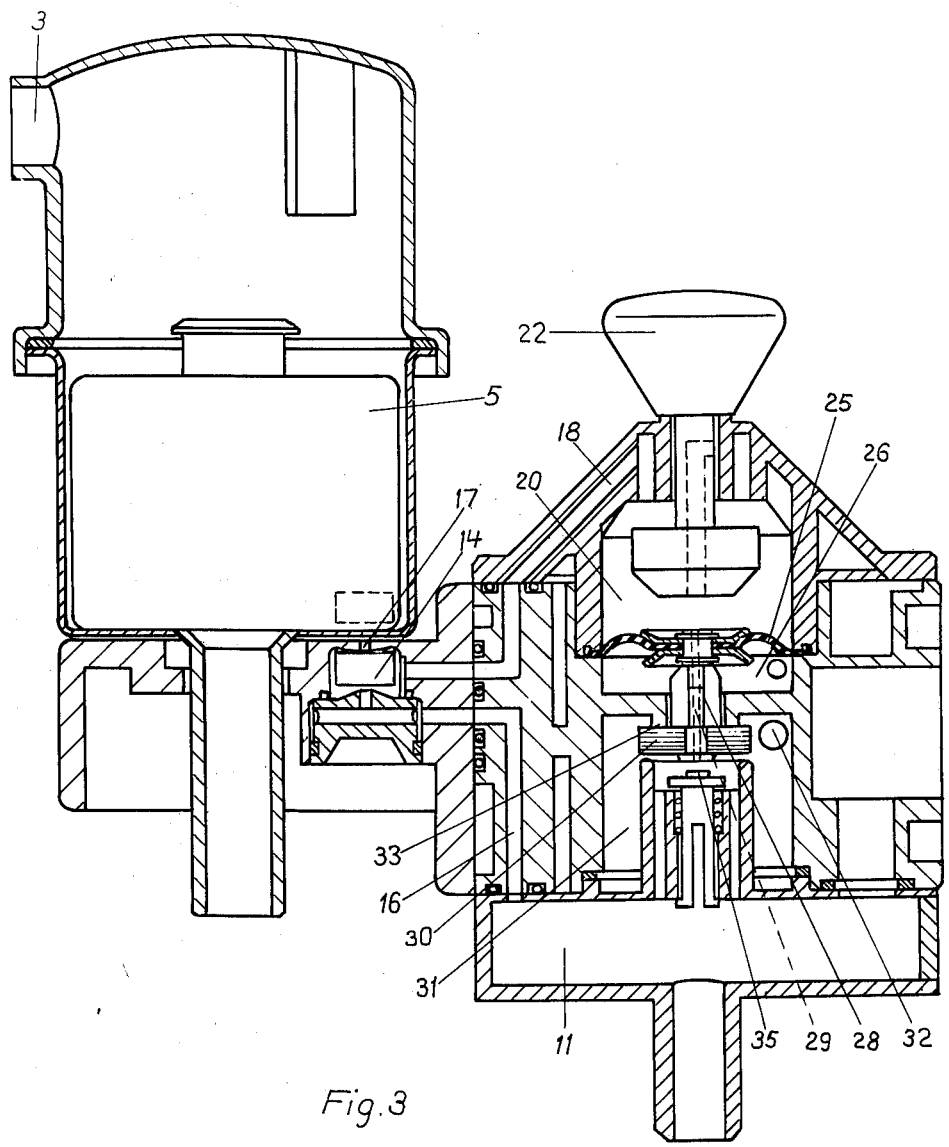
FIG. 3 shows the position during the removal of the milking means after milking.

When the milk flow through the inlet 3 has decreased to a certain, predetermined rate, the float 5 falls to the position shown in FIG. 3, the magnet valve 14 being again raised. The opening 17 to the atmosphere is thereby closed and instead a connection is opened between the chamber 20 and the manifold 11 via the passages 16 and 18. The chamber 20 is now shut off from any entrance of air because the bottom of knob 22 sealingly engages the valve housing, and a vacuum is therefore established in this chamber. The membrane 25 is thus actuated to move upwardly, whereby the valve 30 is adjusted to the position shown in FIG. 3. In this position, the valve 30 seals against the upper valve seat 33, whereby the connection between the chambers 26 and 31 is interrupted. The latter chamber 31 is instead connected to the manifold 11 through the interior of the cylindrical member forming the valve seat 34, whereby the milking means remover (not shown) is activated in that it is subjected to vacuum via the opening 32.

Simultaneously with the upward adjustment of the disc valve 30, the axial passage 29 through the spindle 28 is opened in that the latter is removed from the cushion 35. In this phase, when the removal of the milking means from the cow's udder has already been initiated, if milk should again begin to flow through the inlet 3, the float 5 will again rise so that magnet valve 14 again descends to allow atmospheric air to flow through the opening 17 and the passage 18 into the chamber 20 above the membrane 25. However, since the passage 29 through the spindle 28 is open, this entering atmospheric air will be evacuated via passage 29 to the manifold 11. In this way, a sufficient vacuum is maintained in the chamber 20 to cause the disc valve 30 to remain in the position shown in FIG. 3, so that removal of the milking means is completed.

It will be understood from the foregoing that in the control apparatus as illustrated, the vacuum source 12 is adapted to be connected to the milking means remover (not shown) through a flow connection including the valve seat 34 (when primary valve 30 is open) and the housing opening 32 from chamber 31. Thus, primary valve 30 has a closed position (FIGS. 1 and 2) for preventing operation of the milking means remover and an open position (FIG. 3) for effecting operation of this remover. The secondary valve 14, which is under control of the flow rate sensor 1, has a first position (FIG. 2) for causing the pneumatic actuator 25 to maintain primary valve 30 closed in response to sensing of a normal milk flow rate and has a second position (FIG. 3) for causing actuator 25 to open primary valve 30 in response to sensing a substantial decrease from the normal flow rate. The spindle 28 with its passage 29 constitutes means associated with actuator 25 and operable upon said opening of primary valve 30 to maintain the latter open regardless of the position of secondary valve 14.

It will be understood that the milking means remover (not shown) may be of any construction known in the art and which is activated pneumatically by application of a vacuum.

I claim:

1. Apparatus for controlling operation of a milking means remover to effect automatic removal of the milking means after a milking operation, said apparatus comprising a vacuum source, means forming a flow connection through which the vacuum source is adapted to be connected pneumatically to said remover, said flow connection including a primary valve having an open position for effecting operation of said remover and having a closed position for preventing operation of the remover, a pneumatic actuator operatively connected to the primary valve for actuating the same, a sensor for sensing the rate of milk flow from the milking means, a secondary valve under control of the sensor for actuating the pneumatic actuator, the secondary valve having a first position for causing said actuator to maintain the primary valve closed in response to said sensing of a normal milk flow rate and having a second position for causing the actuator to open the primary valve in response to said sensing of a substantial decrease from said normal milk flow rate, and means associated with the actuator and operable upon said opening of the primary valve to maintain the primary valve open regardless of the position of the secondary valve.

2. The apparatus of claim 1, in which said sensor comprises a float having a permanent magnet, said secondary valve being a magnet valve actuatable by the permanent magnet.

3. The apparatus of claim 1, in which the pneumatic actuator includes a flexible membrane rigidly connected to the primary valve, said connection forming means also forming with said membrane a chamber communicating with the secondary valve, the secondary valve being operable to vary the pressure in said chamber and thereby actuate the membrane.

4. The apparatus of claim 3, in which the actuator is operable to adjust said primary valve to activate the remover in response to a vacuum in said chamber.

5. The apparatus of claim 4, in which said associated means form a normally closed passage adapted when open to connect said chamber to the vacuum source, said actuator being operable to open said passage while adjusting the primary valve to activate the remover.

6. The apparatus of claim 5, in which said associated means include a spindle connecting the actuator membrane to the primary valve and through which said passage extends.

* * * * *